J. D. INGRAM.
DRIVING MECHANISM FOR TRACTORS.
APPLICATION FILED FEB. 7, 1912. RENEWED JAN. 31, 1913.

1,070,811.

Patented Aug. 19, 1913.

Witnesses

Joseph D. Ingram, Inventor by C. A. Snow & Co., Attorneys

UNITED STATES PATENT OFFICE.

JOSEPH D. INGRAM, OF PANHANDLE, TEXAS.

DRIVING MECHANISM FOR TRACTORS.

1,070,811. Specification of Letters Patent. Patented Aug. 19, 1913.

Application filed February 7, 1912, Serial No. 675,928. Renewed January 31, 1913. Serial No. 745,497.

*To all whom it may concern:*

Be it known that I, JOSEPH D. INGRAM, a citizen of the United States, residing at Panhandle, in the county of Carson and State of Texas, have invented a new and useful Driving Mechanism for Tractors, of which the following is a specification.

This invention relates to traction engines and more particularly to mechanism for transmitting motion from the motor to the drive wheel of the engine, the same being an improvement upon the structure disclosed in an application filed by me in the United States Patent Office on August 9, 1911, Serial No. 643,085.

The principal object of the invention is to provide improved transmission gearing for controlling the movements of the machine, said gearing being at all times under the control of the operator.

A further object is to provide gearing of this type which is compact and durable and will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
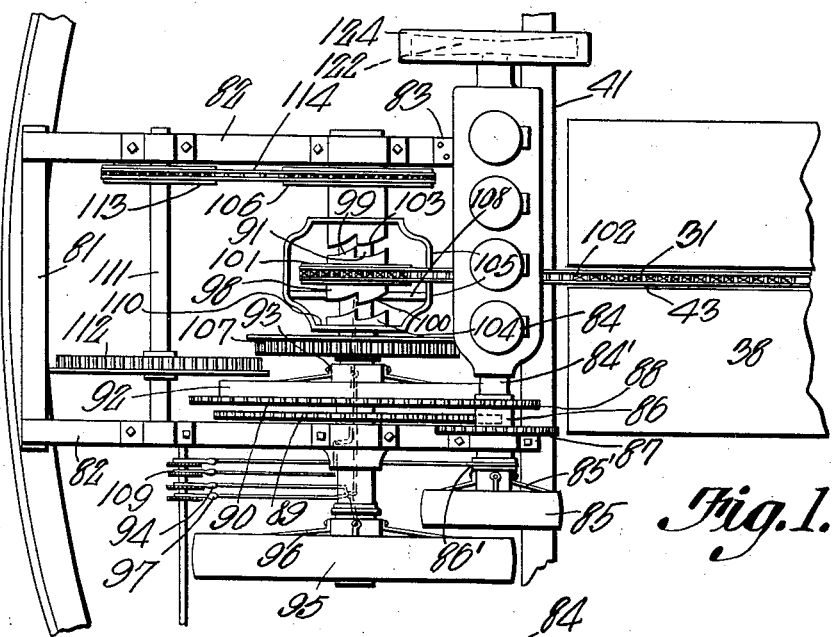
Figure 2:
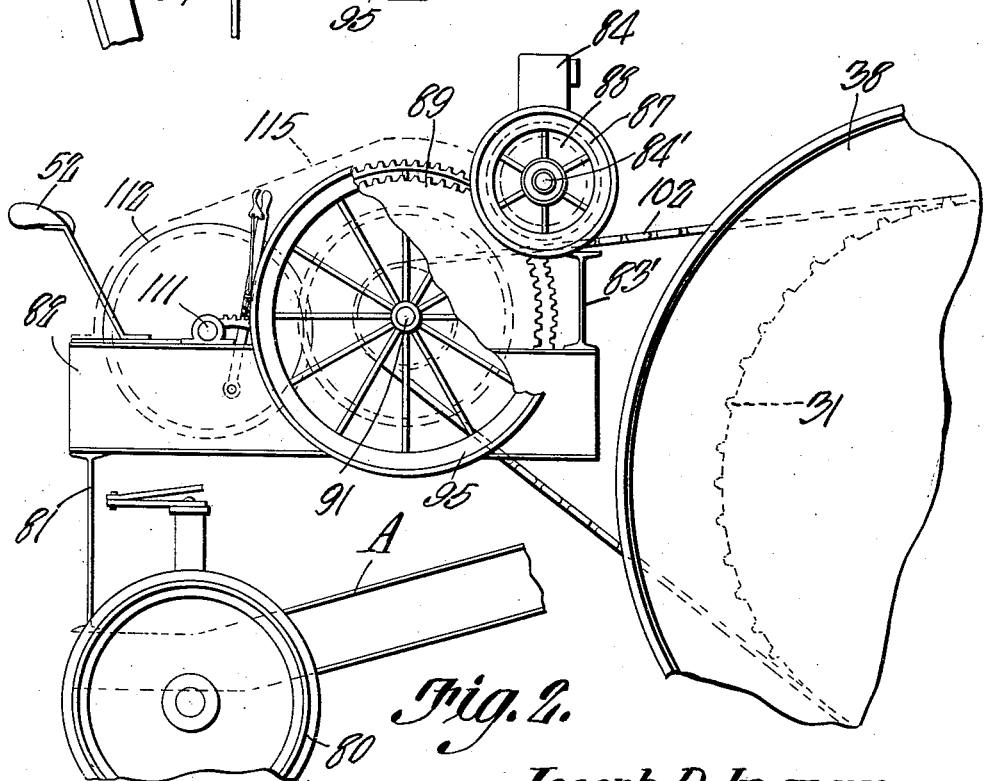

In said drawings:—Figure 1 is a plan view of a portion of a tractor having the present improvements combined therewith. Fig. 2 is a side elevation of the parts shown in Fig. 1, portions being broken away.

Referring to the figures by characters of reference A designates a portion of the main frame of the tractor, the same being supported by a driving wheel, portions of which have been indicated at 38 and by steering wheels 80. A sprocket 31 rotates with and is interposed between the rims of the wheel 38 and is adapted to be actuated by the mechanism constituting the present invention.

Extending transversely of the frame A and secured upon the beam 5, is an upper or supplemental beam 81 constituting a support for the side beams 82 of a supplemental frame structure, these side beams 82 being secured, at their forward ends, upon the cross beam 41 and being held horizontal. This supplemental frame constitutes a support for the drive gearing. Standards 83 are mounted on the beams 41, 82, and 1 and support a motor 84 which can be of any preferred type and the shaft 84' of which has a small drive pulley 85 loosely mounted on one end thereof. An expansible friction clutch 85' is employed for coupling this pulley to shaft 84' and is operable by a sleeve 86 feathered on shaft 84' and provided with a large gear 87 and a small gear 88. The clutch is preferably so constructed that when the sleeve 86 is shifted to one limit of its movement the pulley 85 is coupled to the shaft 84' and when shifted in the opposite direction the pulley is uncoupled and can run free. Any suitable means such as a forked lever 86' can be used for shifting the sleeve on shaft 84'. Gear 87 is adapted when moved in one direction, to mesh with a small gear 89 and when sleeve 86 is moved in the opposite direction gear 87 moves out of mesh and the other gear 88, moves into mesh with a gear 90. Both gears 89 and 90 rotate together and are fixedly secured to a shaft 91 journaled on beams 82. Gear 90 has a laterally extending rim 92 extending around and adapted to be frictionally engaged by an expansible clutch member indicated generally at 93 and which is shiftable laterally relative to rim 92. Said clutch member is loose on the shaft 91 and is adapted to be actuated by a lever 94 located adjacent the seat 52, there being suitable connections between the lever and the clutch member for transmitting motion from one to the other.

A pulley 95 is loosely mounted on one end portion of the shaft 91 and the inner surface of the rim thereof extends around and is adapted to be frictionally engaged by an expansible clutch member 96, this member being feathered on the shaft 91 and adapted to be actuated by a lever 97 located close to the seat 52 and provided with suitable connections whereby motion may be transmitted from the lever to the clutch member.

A sleeve 98 is loosely connected to shaft 91 and has its ends toothed to form clutch faces 99 and 100 respectively. A sprocket 101 is formed on or secured to this sleeve 98 and transmits motion, through a chain 102, to the sprocket 31 hereinbefore referred to, the runs of the chain being extended between the rims of the wheel 38. Clutch members 103 and 104 are loosely mounted on the shaft 91 at opposite sides of the sleeve 98 and are adapted to engage the clutch faces 99 and 100 respectively. These two clutch members 103 and 104 are connected by straps 105 which extend across the sprocket 101 and at sufficient distances therefrom to permit the same to rotate freely. Clutch member 103 has a sprocket 106 secured thereto or formed thereon and clutch member 104 has a gear 107 integral therewith and with member 93. A yoke 108 is connected to the straps 105 and is suitably connected to a lever 109 located adjacent seat 52. By means of this lever the two clutch members 103 and 104 can be simultaneously shifted toward either end of the shaft 91 so as to bring either of said clutch members into engagement with the sleeve 98. It is to be understood that the straps 105 are not secured directly to the clutch members, but are, instead attached to rings 110 preventing said clutch members from moving independently in the direction of the length of shaft 91 but they permit independent rotation of the clutch members.

A counter shaft 111 is journaled on the beams 82 and back of the shaft 91. A gear 112 is keyed or otherwise secured to the counter shaft and meshes with gear 107. Both of these gears 107 and 112 are provided with narrow faces so that gear 107 can be shifted relative to gear 112 to admit moving the two gears out of mesh. A sprocket 113 is secured to and rotates with shaft 111 and a chain 114 is mounted on said sprocket and on the sprocket 106.

It is to be understood that under normal conditions the clutch member 93 is disengaged from the flange 92 and the motor is thus free to operate without causing the machine to be propelled forwardly or backwardly. When it is desired to drive the machine forwardly the clutch members 103 and 104 are shifted so as to bring the member 104 into engagement with the clutch faces 100 and to move the clutch member 103 out of engagement with the clutch face 99. This movement disengages gears 107 and 112. After the gears have thus been adjusted clutch member 93 is expanded into frictional engagement with flange 92 and thus couples the gears 89 and 90 to the gear 107. Gear 107 is thus rotated with the shaft and as its clutch member 104 is in engagement with the clutch face 100, it will be apparent that the sprocket 101 will be rotated and will drive chain 102 and cause the sprocket 31 and the drive wheel to rotate and thus propel the machine forwardly. During this operation gear 112 is free from gear 107 and as sprocket 113 rotates with gear 112, the chain 114, with the sprocket 106 and clutch member 103 will remain idle on the shaft 91. When it is desired to reverse the machine so as to cause it to travel rearwardly, the clutch member 93 is disengaged from flange 92 so as to uncouple the transmission gearing from the motor and clutch members 103 and 104 are then shifted so as to move the member 103 in engagement with clutch face 99, to move the clutch member 104 out of engagement with the clutch face 100 and to move gear 107 into mesh with gear 112. When gears 89 and 90 are again coupled to gear 107, motion will be transmitted to said gear as before, but as the member 104 is disengaged from the sleeve 98, the only operation resulting from the rotation of gear 107 with shaft 91 will be the rotation of gear 112, shaft 11, and sprocket 113. Motion is transmitted to this sprocket through chain 114 to sprocket 106 and as the clutch member 103 is in engagement with the sleeve 98, it will be apparent that said sleeve will be rotated with the clutch member and cause sprocket 101 to drive chain 102 and thus rotate the driving wheel so as to move the machine rearwardly.

A fly wheel 122 is secured to one end of the shaft 84' and is preferably housed within a drum or casing 124.

The transmission gearing is preferably arranged within a housing indicated by dotted lines at 115 in Fig. 2.

The drive pulley 85 is provided for the purpose of transmitting power, through a suitable belt not shown, to any mechanism which it may be desired to actuate by means of the motor 84 while the tractor is stationary.

What is claimed is:—

1. The combination with a frame and a drive wheel, of a motor driven shaft, a drive pulley normally loose on the shaft, a clutch for coupling the pulley to the shaft, a sleeve feathered on the shaft, gears carried by the sleeve, and means for shifting the sleeve, said means constituting means for actuating the clutch to couple and uncouple the pulley relative to the shaft.

2. The combination with a frame and a drive wheel, of a motor driven shaft, a sleeve feathered thereon, gears carried by the sleeve, a main shaft, gears fixedly secured thereto, means for shifting the sleeve to bring either of its gears into mesh with one of the gears on the main shaft, a sleeve loosely mounted on the main shaft, means for transmitting motion therefrom to the drive wheel, said sleeve having opposed clutch faces, clutch members loosely mounted on the main shaft adjacent the opposed clutch faces of the sleeve, said clutches being movable together, a gear movable with said clutch members and loose on the main shaft, a counter shaft, means for transmitting motion therefrom to one of the clutch members on the main shaft, a gear on the counter shaft, means for coupling the loose gear on the main shaft to the fixed gears on said shaft, and means for shifting the loose gear and the clutch members on the main shaft to transmit motion to the sleeve on the main shaft either directly from the main shaft or through the counter shaft.

3. The combination with a frame and a drive wheel, of a main shaft, a sleeve loosely mounted thereon, means for driving the main shaft, means for transmitting motion from the sleeve to the drive wheel, opposed clutch members loosely mounted on the main shaft, a gear movable therewith, a counter shaft, a gear thereon normally out of mesh with the gear on the main shaft, means for transmitting motion from the counter shaft to one of the clutch members on the main shaft, and means for simultaneously shifting said clutch member in engagement with the sleeve and the gear on the main shaft into mesh with the gear on the counter shaft, said gear and clutch member being shiftable in the opposite direction to unmesh the gears and to place the other clutch member into engagement with the sleeve, and means for coupling the loose gear to the main shaft.

4. The combination with a frame and a drive wheel, of a main shaft, means for actuating the same, a sleeve loosely mounted on the shaft, means for transmitting motion from the sleeve to the drive wheel, oppositely disposed clutch members fixedly connected and loosely mounted on the main shaft at opposite sides of the sleeve, a gear loosely mounted on the main shaft and movable with the clutch members, a counter shaft, a gear mounted thereon, means for transmitting motion from the counter shaft to one of the clutch members, means for shifting said clutch member and the loose gear on the main shaft to simultaneously place said clutch member into engagement with the sleeve and to place the loose gear in mesh with the gear on the counter shaft, said gear and clutch member being shiftable in the opposite direction to unmesh the gear and to place the other clutch member in engagement with the sleeve, and means for coupling the gear and clutch members to the main shaft when said gear and members are in either of said positions.

5. The combination with a frame, and a drive wheel, of a main shaft, means for actuating the same, a sleeve loosely mounted on the shaft, means for transmitting motion from the sleeve to the drive wheel, oppositely disposed clutch members fixedly connected and loosely mounted on the main shaft at opposite sides of the sleeve, a gear loosely mounted on the main shaft and movable with the clutch members, a counter shaft, a gear mounted thereon, means for transmitting motion from the counter shaft to one of the clutch members, means for shifting said clutch member and the loose gear on the main shaft to simultaneously place said clutch member into engagement with the sleeve and to place the loose gear in mesh with the gear on the counter shaft, said gear and clutch member being shiftable in the opposite direction to unmesh the gear and to place the other clutch member in engagement with the sleeve, means for coupling the gear and the clutch members to the main shaft when said gear and members are in either of said positions, a drive pulley loosely mounted on the main shaft, and an expansible clutch member feathered on the shaft for coupling the pulley to the shaft.

In testimony that I claim the foregoing as my own, I have hereto affixed my signature in the presence of two witnesses.

JOSEPH D. INGRAM.

Witnesses:
J. I. WYNN,
ROY POOL.

---

Copies of this patent may be obtained for five cents each, by addressing the "Commissioner of Patents, Washington, D. C."